(12) United States Patent
Sagawa

(10) Patent No.: US 6,426,763 B1
(45) Date of Patent: Jul. 30, 2002

(54) LIQUID CRYSTAL DISPLAY DEVICE HAVING LIGHT-GUIDE PLATE FOR REFLECTING AND DIFFUSING LIGHT-SOURCE LIGHT SO THAT THE LIGHT IS UNIFORMLY INCIDENT ON LIQUID CRYSTAL CELL

(75) Inventor: Fumihiko Sagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/427,337

(22) Filed: Oct. 26, 1999

(30) Foreign Application Priority Data

Oct. 28, 1998 (JP) .......................................... 10-307655

(51) Int. Cl.⁷ .......................................... G02F 1/1335
(52) U.S. Cl. .............................. 346/65; 349/64; 362/31
(58) Field of Search ........................... 349/65, 69, 166; 362/31

(56) References Cited

U.S. PATENT DOCUMENTS

| 5,677,746 | A | | 10/1997 | Yano ............................. 345/65 |
| 5,963,280 | A | * | 10/1999 | Okuda et al. ................. 349/65 |
| 6,055,029 | A | * | 4/2000 | Kurihara et al. .............. 349/65 |
| 6,163,351 | A | * | 12/2000 | Nakayama ..................... 349/65 |

* cited by examiner

Primary Examiner—Toan Ton
(74) Attorney, Agent, or Firm—Brinks Hofer Gilson & Lione

(57) ABSTRACT

In a light-guide plate for use in a liquid crystal display device, light enters a transmissive plate member from one end face thereof, is reflected and diffused inside the plate member, and emerges from one main surface of the plate member. A guide member is formed integrally with the main surface so as to guide a light-diffusing sheet member to be placed thereon.

25 Claims, 3 Drawing Sheets

LIQUID CRYSTAL DISPLAY DEVICE HAVING LIGHT-GUIDE PLATE FOR REFLECTING AND DIFFUSING LIGHT-SOURCE LIGHT SO THAT THE LIGHT IS UNIFORMLY INCIDENT ON LIQUID CRYSTAL CELL

BACKGROUND OF THE INVENTION

1. Field of the Invention

The present invention relates to a light-guide plate, and more particularly, to a liquid crystal display device having a light-guide plate for reflecting and diffusing light emitted from a linear light source, such as a white fluorescent lamp or an elongated mini-lamp, disposed at one end of the back of a liquid crystal cell so that the light is uniformly incident on the liquid crystal cell.

2. Description of the Related Art

Conventionally, a display screen of a liquid crystal display device (LCD) requires surface illumination that provides uniform and high brightness and uniform lightness. However, since a white fluorescent lamp, an elongated minilamp, and the like are not surface light sources, but are linear light sources, a light-guide plate is used to reflect and diffuse light from these linear light sources so that the light is uniformly incident on the whole liquid crystal cell.

FIG. 3 is a cross-sectional view schematically showing the structure of a liquid crystal display device using a conventional light-guide plate, FIG. 4 is a cross-sectional view showing the principal part of the liquid crystal display device, and FIG. 5 is a perspective view showing an example of a structure of the conventional light-guide plate.

Referring to FIG. 3, the liquid crystal display device comprises a liquid crystal cell 1, a linear light source 2, such as a white fluorescent lamp or an elongated mini-lamp, disposed at one end of the back side of the liquid crystal cell 1, a light-guide plate 3 disposed on the back side of the liquid crystal cell 1, and a light-diffusing sheet member 4 placed on the light-guide plate 3.

The light-guide plate 3 includes a rectangular plate member 11 made of acrylic resin having a substantially high light transmittance, and has, on its bottom face, multiple concave dots formed longitudinally and laterally for light reflection and diffusion, though they are not shown. Instead of the concave dots, multiple reflecting films may be formed longitudinally and laterally.

An angular-U-shaped guide 12 made of rubber or the like is bonded to the peripheral portion of the upper surface of the plate member 11, excluding one longitudinal end portion, with an adhesive or the like. The height of the guide 12 is set to be slightly larger than the overall thickness of the light-diffusing sheet member 4 placed on the plate member 11.

As shown in FIGS. 4 and 5, the light-diffusing sheet member 4 is formed by sequentially stacking a rectangular diffusing sheet 13, a rectangular lens sheet 14 having pits and projections periodically formed in the lateral direction, and a rectangular lens sheet 15 having pits and projections periodically formed in the lateral direction. The peripheral portions of the sheets 13 to 15 are bonded with doubled-sided adhesive tapes 16 and combined into the light-diffusing sheet member 4, as shown in FIG. 4. The sheets 13 to 15 may be bonded by fusing or by other means instead of using the double-sided adhesive tapes 16. The combined light-diffusing sheet member 4 is fixed on the back of the liquid crystal cell 1 via a spacer 17 with a double-sided adhesive tape or the like.

In this liquid crystal display device, white light emitted from the linear light source 2 enters the light-guide plate 3 from one end face, is reflected and diffused inside the light-guide plate 3 by the multiple dots (or multiple reflecting films), and emerges from the entire upper surface of the light-guide plate 3. The emergent light is diffused and made uniform in the plane direction by the diffusing sheet 13, sequentially passes through the lens sheets 14 and 15, and is thereby turned into light that is uniform in the lateral and longitudinal directions of the sheet. The light enters the liquid crystal cell 1 as surface illumination that is uniformly bright over the plane.

In the above-described light-guide plate 3, the guide 12 made of rubber or the like is bonded to the peripheral portion of the upper surface of the plate member 11 with the adhesive or the like. Therefore, alignment while bonding the guide 12 on the plate member 11 is difficult, and working efficiency is lowered. This is a factor in increasing manufacturing costs.

Since the light-diffusing sheet member 4 is formed by bonding the peripheral portions of the sheets 13 to 15 by the double-sided adhesive tapes 16, the overall thickness thereof increases due to interposition of the double-sided adhesive tapes 16. For this reason, it is difficult to reduce the thickness of the liquid crystal display device, particularly, the thickness of the light-guide plate.

Furthermore, since the peripheral portions of the sheets 13 to 15 are bonded by the double-sided adhesive tapes 16, the center portions thereof are apt to deflect, and the clearances between the center portions of the sheets 13 and 14 and between the center portions of the sheets 14 and 15 differ slightly from the clearance between the peripheral portions. Such deflection and clearance difference cause the appearance of diffraction fringes, so-called called moiré and interference fringes, on the screen of the liquid crystal display device.

SUMMARY OF THE INVENTION

The present invention has been made in view of the above-described circumstances, and an object of the present invention is to provide a simplified and low-profile light-guide plate that does not cause moiré and interference fringes.

In order to achieve the above object, according to an aspect of the present invention, there is provided a light-guide plate, in which light enters a transmissive plate member from one end face, is reflected and diffused inside the plate member, and emerges from one main surface of the plate member. A guide member is formed integrally with the main surface so as to guide a light-diffusing sheet member to be placed thereon.

Preferably, the plate member in the light-guide plate is rectangular, and the guide member is a rib formed along two or three adjoining sides of the main surface of the plate member.

Preferably, the height of the guide member is set to be larger than the thickness of the light-diffusing sheet member to be placed on the main surface.

In the light-guide plate of the present invention, since the guide member guides the light-diffusing sheet member onto the main surface of the plate member, the light-diffusing guide member is easily positioned and fixed merely by being dropped onto the main surface. This eliminates the necessity of fixing the light-diffusing sheet member by using a double-sided adhesive tape as was necessary previously, and the thickness of the overall light-guide plate including the light-diffusing sheet member is reduced, which allows a low profile.

Since the double-sided adhesive tape is not used, clearance does not vary in the light-diffusing sheet member, and moiré and interference fringes are not produced.

Since the guide member is formed integrally with the main surface of the plate member, the structure is simplified, and handling is facilitated. This makes it possible to omit the step of bonding a separate guide member onto one main surface of the plate member in the conventional art, and to thereby reduce manufacturing costs.

When the height of the guide member is set to be larger than the thickness of the light-diffusing sheet member to be placed on the main surface, stress is applied only to the guide member when fixing the light-guide plate, and is not applied to the light-diffusing sheet member to be placed. For this reason, external stress will not be directly applied to the light-diffusing sheet member, and distortion is prevented from being caused due to stress.

Further objects, features, and advantages of the present invention will become apparent from the following description of the preferred embodiments with reference to the attached drawings.

DESCRIPTION OF THE PREFERRED EMBODIMENTS

Preferred embodiments of the light-guide plate of the present invention will be described with reference to the drawings.

First Embodiment

Figure 1:
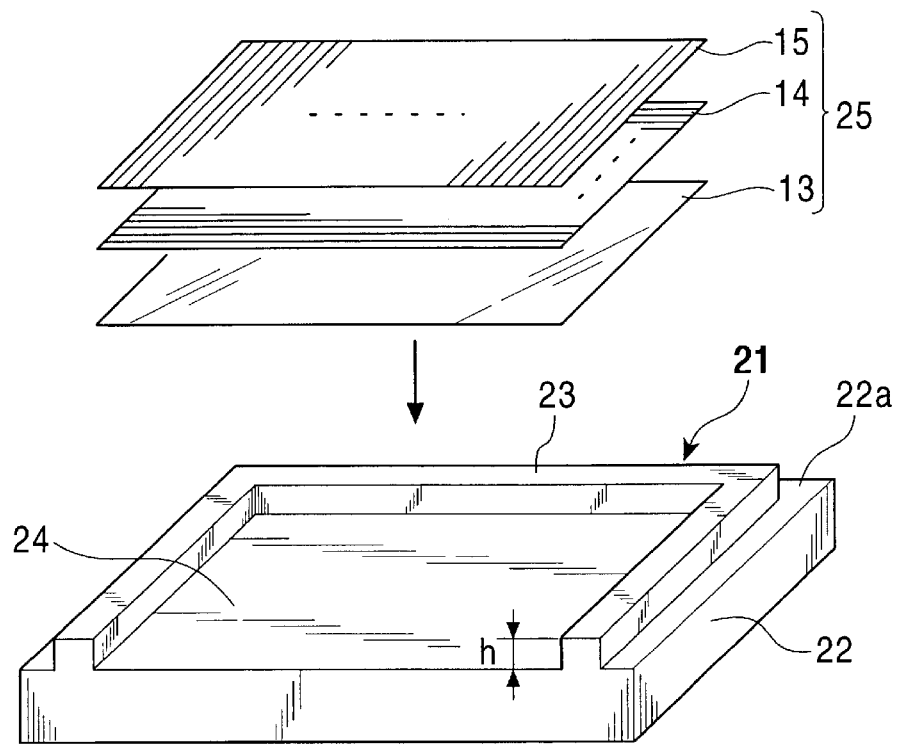
FIG. 1 is a perspective view of a light-guide plate according to first embodiment of the present invention.

FIG. 1 is a perspective view of a light-guide plate according to a first embodiment of the present invention.

A light-guide plate 21 of the first embodiment is molded from acrylic resin having a substantially high light transmittance, in which a rib-like guide (guide member) 23 having a substantially angular-U shape is formed integrally with the peripheral portions on three sides of an upper surface (one main surface) 22a of a rectangular plate member 22.

An area 24 defined by the guide 23 has a size to hold a light-diffusing sheet member 25 therein without any clearance. The light-diffusing sheet member 25 is formed of a laminate of a rectangular diffusing sheet 13, a rectangular lens sheet 14 having pits and projections periodically formed in the lateral direction, and a rectangular lens sheet 15 having pits and projections periodically formed in the longitudinal direction.

The height h of the guide 23 is set to be slightly larger than the overall thickness of the light-diffusing sheet member 25 including the sheets 13 to 15, that is, the sum of thicknesses of the diffusing sheet 13 and the lens sheets 14 and 15, for example, approximately 0.7 mm.

The light-diffusing sheet member 25 may be formed of at least one of the sheets 13 to 15 according to the required properties of the liquid crystal cell. For example, the light-diffusing sheet member 25 may be formed of only the diffusing sheet 13, may be formed of a laminate of the diffusing sheet 13 and one of the lens sheets 14 and 15, or may be composed of all the sheets 13 to 15 sequentially placed one on another.

In placing the light-diffusing sheet member 25 on the light-guide plate 21, first, the diffusing sheet 13 is aligned with the guide 23 and is dropped into the area 24 defined by the guide 23. Subsequently, one or both the lens sheets 14 and 15 are aligned with the guide 23 as necessary, and are dropped into the area 24 in order.

As described above, according to the light-guide plate 21 of the first embodiment, the diffusing sheet 13 and the lens sheets 14 and 15 constituting the light-diffusing sheet member 25 are sequentially dropped into the area 24 after being aligned with the guide 23, which allows the light-diffusing sheet member 25 to be easily positioned and fixed.

Since it is only necessary to merely drop the diffusing sheet 13 and the lens sheets 14 and 15, there is no need to fix the sheets with a double-sided adhesive tape or the like as before. This makes it possible to reduce the overall thickness of the light-diffusing sheet member 25 including the diffusing sheet 13 and the lens sheets 14 and 15, and to thereby achieve substantial thickness reduction.

Since the double-sided adhesive tape is not used, the diffusing sheet 13 and the lens sheets 14 and 15 tightly adhere to one another in the plane direction, and the clearance does not vary in the light-diffusing sheet member 25. As a result, there is no danger that moiré and interference fringes will be caused by variations in clearance.

Since the guide 23 is formed integrally with the main surface 22a of the plate member 22, the structure is simplified and handling is facilitated. Therefore, it is possible to omit the step of bonding the separate guide 12 onto the upper surface of the plate member 11 in the conventional art, and to thereby reduce manufacturing costs.

Furthermore, since the height h of the guide 23 is set to be larger than the overall thickness of the light-diffusing sheet member 25 including the diffusing sheet 13 and the lens sheets 14 and 15, there is no danger that external stress will be directly applied to the light-diffusing sheet member 25, thereby preventing distortion resulting from stress.

Second Embodiment

Figure 2:
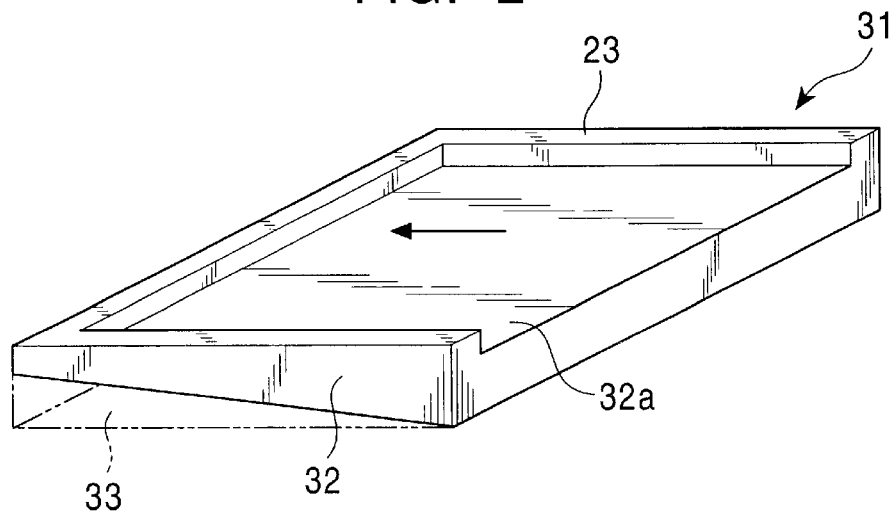
FIG. 2 is a perspective view of a light-guide plate according to a second embodiment of the present invention.
Figure 3:
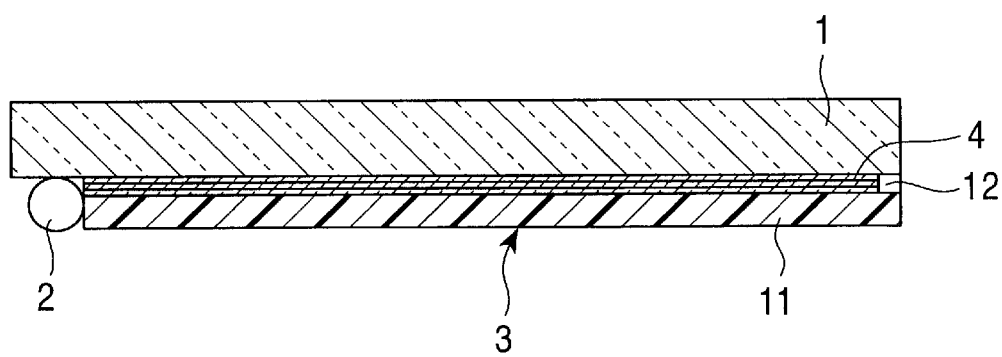
FIG. 3 is a cross-sectional view schematically showing the structure of a liquid crystal display device using a conventional light-guide plate.
Figure 4:
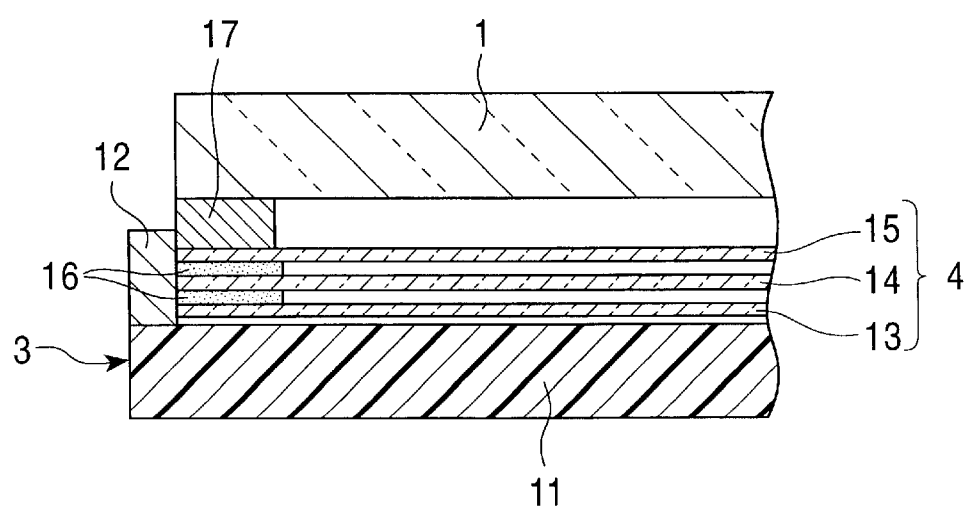
FIG. 4 is a cross-sectional view showing the principal part of the liquid crystal display device using the conventional light-guide plate.
Figure 5:
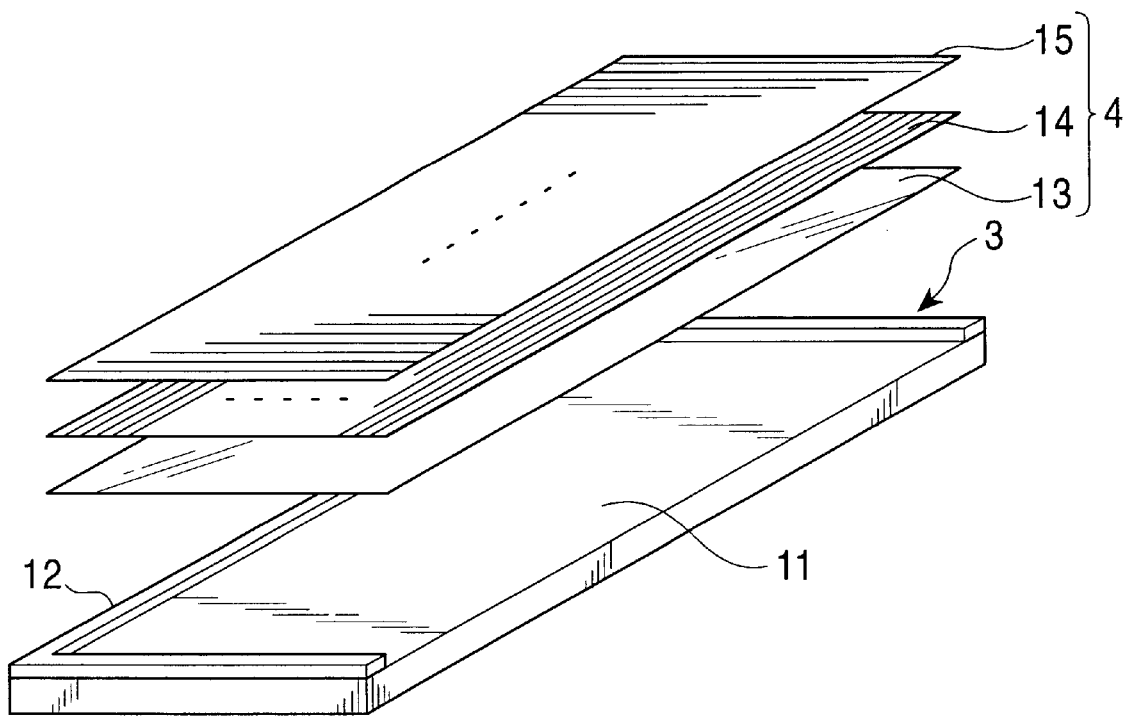
FIG. 5 is a perspective view showing an example of a structure of the conventional light-guide plate.

FIG. 2 is a perspective view of a light-guide plate according to a second embodiment of the present invention.

In the above-described light-guide plate 21 of the first embodiment, the rib-like guide 23 having a substantially angular-U shape is formed integrally with the peripheral portions on three sides of the upper surface 22a of the rectangular plate member 22. In contrast, in a light-guide plate 31 of the second embodiment, a rib-like guide 23 having a substantially angular-U shape is formed integrally with the peripheral portions on three sides, excluding one thick side, of an upper surface 32a of a rectangular plate member 32 that has a wedge-shaped cross section in the lateral direction (in the direction of the arrow in FIG. 2).

The manner in which a light-diffusing sheet member 25 is placed on the light-guide plate 31 is just the same as that of the above-described light-guide plate 21 of the first embodiment. The light-diffusing sheet member 25 is also formed of at least one of the sheets 13 to 15 according to the required properties of the liquid crystal cell, in just the same manner as that of the above light-guide plate 21.

The light-guide plate 31 of the second embodiment provides operations and advantages similar to those of the light-guide plate 21 of the first embodiment.

When the light-guide plate 31 is assembled with a liquid crystal cell and a linear light source to construct a liquid crystal display device, since the cross section of the light-guide plate 31 in the lateral direction is wedge-shaped, the cross-sectional area thereof is smaller than that of the light-guide plate 21 of the first embodiment, which reduces the weight. Furthermore, a space 33 formed under the pointed end of the wedge-shaped light-guide plate 31 can be effectively used as a space for containing components, such as a planar flexible printed board and a card IC.

While the preferred embodiments of the light-guide plate according to the present invention have been described with reference to the drawings, specific structures are not limited to those in the above embodiments, and various modifications are possible without departing from the scope of the present invention. For example, while the guide 23 is formed of a single rib having an angular-U shape, a linear guide may be formed on each side. Furthermore, rectangular or semi-circular cutouts may be formed in one or more portions of the guide 23, or a plurality of short guides may be formed in a linear or angular-U form.

As described above, according to the light-guide plate of the present invention, since it is only necessary to drop the light-diffusing sheet member into the area defined by the guide member, the light-diffusing sheet member can be easily positioned and fixed. This eliminates the need to use a double-sided adhesive tape or the like as before. Accordingly, it is possible to reduce the thickness of the overall light-guide plate including the light-diffusing sheet member, and to reduce the thickness of a liquid crystal display device to which this light-guide plate is applied.

Since the double-sided adhesive tape is not used, there is no fear that clearance will vary in the light-diffusing sheet member, thereby preventing moiré and interference fringes.

Since the guide member is formed integrally with one main surface of the plate member, the structure is simplified and handling is facilitated. Moreover, it is possible to omit the step of bonding a separate guide member onto one main surface of the plate member in the conventional art, and to thereby reduce manufacturing costs.

When the height of the guide member is set to be larger than the thickness of the light-diffusing sheet member to be placed on the main surface, stress is applied only to the guide member when fixing the light-guide plate, and there is no fear that external stress will be directly applied to the light-diffusing sheet member, which prevents distortion resulting from the stress.

What is claimed is:

1. A liquid crystal display device comprising:
   a liquid crystal cell;
   a transmissive plate member;
   a light-diffusing sheet member; and
   a light-guide member to guide light from a light source to said liquid crystal cell, the light-guide member having a main surface and a guide member integrally formed with said main surface,
   wherein said light-guide member is configured to receive light from one end of the plate member, reflect and diffuse the light inside said plate member, and emit the light from the main surface of said plate member, and the guide member is configured to retain the light-diffusing sheet member on said main surface.

2. A liquid crystal display device according to claim 1, wherein the main surface of said plate member is rectangular, and said guide member is a rib formed along at least two adjoining sides of said main surface of said plate member.

3. A liquid crystal display device according to claim 1, wherein a height of said guide member is larger than a thickness of said light-diffusing sheet member.

4. A liquid crystal display device according to claim 1, wherein the light-guide member is formed from acrylic resin.

5. A liquid crystal display device according to claim 1, wherein the light-diffusing sheet member comprises a plurality of sheets, the plurality of sheets including a diffusion sheet and at least one lens sheet.

6. A liquid crystal display device according to claim 1, wherein a height of the guide member is slightly larger than a thickness of said light-diffusing sheet member.

7. A liquid crystal display device according to claim 1, wherein the guide member is formed on three adjoining sides of the main surface of the plate member in a U-shape.

8. A liquid crystal display device according to claim 1, wherein the guide member is rectangular.

9. A liquid crystal display device according to claim 1, wherein the guide member is a continuous rib formed along at least two adjoining sides of the main surface of the plate member.

10. A liquid crystal display device according to claim 1, wherein the guide member has one of rectangular and semi-circular cutouts formed in portions of the guide member.

11. A liquid crystal display device according to claim 1, wherein the guide member is a rib having a plurality of portions and at least one portion of the guide member is non-continuous with the other portions of the guide member.

12. A liquid crystal display device according to claim 1, wherein the plate member has a wedge-shaped cross-section having a thin side and a thick side.

13. A liquid crystal display device according to claim 12, wherein the guide member is not formed on the thick side of the plate member.

14. A liquid crystal display device according to claim 1, wherein the plate member has a rectangular cross-section.

15. A liquid crystal display device comprising:
   a liquid crystal cell;
   a transmissive plate member;
   a light-diffusing sheet member; and
   a light-guide member to guide light from a light source to the liquid crystal cell, the light-guide member having a main surface and a guide member integrally formed with the main surface, the guide member being a rib, the rib having portions formed one of only along two opposing sides of the main surface of the plate member and along all sides of the main surface of the plate member,
   wherein the light-guide member is configured to receive light from one end of the plate member, reflect and diffuse the light inside the plate member, and emit the light from the main surface of the plate member, and the guide member is configured to retain the light-diffusing sheet member on the main surface.

16. A liquid crystal display device according to claim 15, wherein said main surface of said plate member is rectangular.

17. A liquid crystal display device according to claim 15, wherein a height of said guide member is larger than a thickness of said light-diffusing sheet member.

18. A liquid crystal display device according to claim 15, wherein the light-guide member is formed from acrylic resin.

19. A liquid crystal display device according to claim 15, wherein the light-diffusing sheet member comprises a plurality of sheets, the plurality of sheets including a diffusion sheet and at least one lens sheet.

20. A liquid crystal display device according to claim 15, wherein a height of the guide member is slightly larger than a thickness of said light-diffusing sheet member.

21. A liquid crystal display device according to claim 15, wherein the guide member has one of rectangular and semi-circular cutouts formed in the portions of the guide member.

22. A liquid crystal display device according to claim 15, wherein the portions are formed along all sides of the main surface of the plate member, and at least one portion of the guide member is non-continuous with the other portions of the guide member.

23. A liquid crystal display device according to claim 22, wherein the guide member is not formed on the thick side of the plate member.

24. A liquid crystal display device according to claim 15, wherein the plate member has a wedge-shaped cross-section having a thin side and a thick side.

25. A liquid crystal display device according to claim 15, wherein the plate member has a rectangular cross-section.

* * * * *